United States Patent [19]

Asrar

[11] Patent Number: 5,750,603
[45] Date of Patent: May 12, 1998

[54] POLYMER-BOUND NON-HALOGEN FIRE RESISTANT COMPOSITIONS

[75] Inventor: Jawed Asrar, Chesterfield, Mo.

[73] Assignee: Solutia Inc., St. Louis, Mich.

[21] Appl. No.: 862,355

[22] Filed: May 23, 1997

[51] Int. Cl.$^6$ ................ C08G 79/04; C08K 5/5313
[52] U.S. Cl. ................................. 524/139; 528/321
[58] Field of Search ............................ 524/139; 528/321

[56] References Cited

U.S. PATENT DOCUMENTS

| | | |
|---|---|---|
| 3,941,752 | 3/1976 | Kleiner et al. . |
| 4,032,517 | 6/1977 | Pickett et al. . |
| 4,081,463 | 3/1978 | Birum et al. . |
| 4,169,935 | 10/1979 | Hoheisel et al. ................ 524/139 |
| 4,233,434 | 11/1980 | Kraus et al. ................ 528/321 |
| 4,298,518 | 11/1981 | Ohmura et al. . |
| 4,649,177 | 3/1987 | Gabbert et al. ................ 528/321 |

*Primary Examiner*—Veronica P. Hoke
*Attorney, Agent, or Firm*—Fitzpatrick, Cella, Harper & Scinto

[57] ABSTRACT

A flame-retardant polyamide that is the polycondensation product of at least one dicarboxylic acid, at least one diamine and a flame-retarding carboxyphosphinic acid monomer, said polyamide comprising between about 0.10% and about 1.0% by weight of phosphorous. The polyamide can be formed into fibers for further fabrication into flame-retardant articles and textiles or directly molded or extruded into shaped articles.

33 Claims, No Drawings

POLYMER-BOUND NON-HALOGEN FIRE RESISTANT COMPOSITIONS

FIELD OF THE INVENTION

This invention relates to polyamides and, more particularly, to fire resistant phosphorous-containing polyamides.

BACKGROUND OF THE INVENTION

Fire resistance of polyamides is improved by the use of additives. Low molecular weight fire retardant additives, however, are lost from the polymer during its lifetime adversely affecting the ultimate performance of the products. Leaching out of the additives also causes blooming which affects the surface appearance of the product. The loss of such additives is very pronounced in polyamide fibers, the most prevalent end use of polyamides, due to their high surface area.

Therefore, there has been considerable effort in the art to address the issue of fire retardant additive loss by using polymeric additives. One solution attempted is the use of high molecular weight additives. Although these additives are not as readily lost from the polymer, in part due to low vapor pressure, they present compatibility and miscibility problems that arise from fundamental thermodynamics. Further, incompatibility of additives increases with increase in the molecular weight of the additive. Unique problems arise for every polymer/additive pair.

Another approach to polyamide fire resistance is the use of reactive polymer modifiers which provide the fire retardant properties to the polymer by becoming part of the polymer chain. Since these reactive fire retardant modifiers are chemically bound within the polymer chain, they are not lost with time or use, and are available to provide fire retardancy through the useful life of the polymer.

Generally, halogenated compounds have been used as fire retardant modifiers for polyamides. These compounds typically inhibit the vapor phase combustion of fuel gases by a free radical reaction. However, there is considerable activity in the prior art to replace halogenated fire retardants. Industry is under pressure to move to environmentally friendly, non-fugitive fire retardants and to provide polymer products that don't release toxic gases during a fire.

Phosphorus containing compounds can provide fire retardant properties by altering the pathway of a substrate's thermal degradation, promoting solid state reaction leading to carbonization or "char" formation. Methods of incorporating other phosphorous-containing additives into copolyamides are described in U.S. Pat. No. 4,032,517 (Pickett, Jr. et al.). Phosphoric acid, formed during degradation of phosphorus containing polymers, also reduces the permeability of the char thus providing an improved barrier to passage of air and fuel. Reactive phosphorus containing compounds which would form polymer bound polyamide fire retardants would, thus not only be useful but would be an attractive solution. Such polyamides would be particularly useful in industrial applications of polyamide fiber textiles such as carpet and upholstery.

SUMMARY OF THE INVENTION

This invention provides new polyamide compositions which exhibit improved fire resistance by incorporating fire retarding modifiers into the polyamide.

Accordingly, a principal object of this invention is to provide polyamides wherein a comonomer in the copolyamides is a phosphorous-containing reactive non-halogen flame retardant (NHFR).

Other objects of this invention will in part be obvious and will in part appear from the following description and claims.

These and other objects are accomplished by the polyamide of this invention, which is the polycondensation product of at least one dicarboxylic acid, at least one diamine and a carboxy-phosphinic acid, said carboxy-phosphinic acid being a source of flame-retardant phosphorus and having the formula:

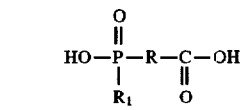

wherein R is saturated or unsaturated, straight chain, branched or cyclic $C_1$ to $C_{15}$ alkylene, or a $C_5$ to $C_{15}$ arylene or aralkylene, wherein the alkylene portion is saturated or unsaturated, straight chain branched or cyclic, and $R_1$ is saturated or unsaturated, straight chain, branched or cyclic lower alkyl, lower alkoxy or aryl, alkylaryl or alkoxyaryl, wherein the alkyl portion is saturated or unsaturated, straight chain branched or cyclic; and wherein R and $R_1$ may contain one or more O or S atoms; such that the polyamide comprises between about 0.10% and about 1.0% by weight of phosphorous.

DETAILED DESCRIPTION OF THE INVENTION

Polycondensation of at least one dicarboxylic acid, at least one diamine and a carboxy-phosphinic acid produce the polyamide of the invention. The carboxy-phosphinic acid used in the invention has the formula:

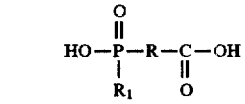

wherein R is saturated or unsaturated, straight chain, branched or cyclic $C_1$ to $C_{15}$ alkylene, or a $C_5$ to $C_{15}$ arylene or aralkylene, wherein the alkylene portion is saturated or unsaturated, straight chain branched or cyclic, and $R_1$ is lower alkyl, lower alkoxy, allyl, aryl alkylaryl or alkoxyaryl, wherein the alkyl portion is saturated or unsaturated, straight chain branched or cyclic, and wherein R and $R_1$ may contain one or more O or S atoms; such that the polyamide comprises between about 0.10% and about 1.0% by weight of phosphorous.

The term "polyamide" in this description is intended to encompass copolyamides also. The term "lower alkyl" and "lower alkylene" means straight or branched chain alkyl and alkylene, respectively, having 1 to 7 carbon atoms such as methyl, ethyl, propyl, butyl, pentyl, hexyl, heptyl, methylene, ethylene, propylene, butylene, pentylene, hexylene, heptylene, and the branched chain isomers thereof. The term "lower alkoxy" means straight or branched chain alkoxy having 1 to 7 carbon atoms such as methoxy, ethoxy, propoxy, butoxy, pentoxy, hexoxy, heptoxy and the branched chain isomers thereof. The term "allyl" as used herein means the 1-propenyl radical, —$CH_2$—$CH_2$=$CH_2$. The term "aryl" means substituted and unsubstituted phenyl and naphthyl wherein the substituents comprise lower alkyl, lower alkoxy, allyl and halo moieties. The terms "alkylaryl"

and "alkoxyaryl" mean combinations of lower alkyl and aryl, and lower alkoxy and aryl, respectively, as defined herein. The terms "aryl", "alkylaryl" and "alkoxyaryl" are intended to comprise $C_6$ to $C_{20}$ moieties. The term "halo" means fluoro, chloro, bromo, or iodo.

In the typical production of polyamides, a dicarboxylic acid, or lower alkyl ester thereof, is condensed with a diamine according to the following formula:

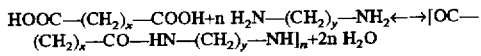

Those of ordinary skill in the art recognized that by mixing more than one dicarboxylic acid and more than one diamine a variety of polyamides and copolyamides are prepared. The most frequently used dicarboxylic acids are adipic and sebacic acids and the most frequently used diamine is hexamethylene diamine. Methods of forming polyamide resin compositions including dicarboxylic acids and diamines that can be used in the production of the polyamide of this invention are described in U.S. Pat. No. 4,298,518 (Ohmura et al.), the contents of which are hereby incorporated into this description. The flame-retardant polyamide of this invention can comprise structural units derived from more than one dicarboxylic acid and more than one diamine. In the polyamide of the invention, the carboxy-phosphinic acid described above replaces a portion of the dicarboxylic acid typically used, thus forming the modified polyamide.

The carboxy phosphinic acids which provide the flame-retardant phosphorous-containing structural units of the polyamides of this invention are described in U.S. Pat. No. 4,081,463 (Birum et al.) and U.S. Pat. No. 3,941,752 (Kleiner et al.), the disclosures of which are hereby incorporated into this description. In a preferred embodiment of the polyamide of this invention, $R_1$ is $C_6H_5$ and R is $-CH_2-CH_2-$. The phosphinic acid 2-carboxyethyl (phenyl)phosphinic acid, referred to herein as "CEPPA", is used to provide the preferred flame-retardant phosphorus-containing structural unit.

The polyamide of the invention typically comprises between about 0.10% and about 1.0% by weight phosphorous, preferably between about 0.16% and about 0.56% by weight phosphorous. In a particularly preferred embodiment the polyamide comprises about 0.25% by weight phosphorous.

In general, the polyamides of this invention may be prepared by polycondensation reaction of difunctional polyamide-forming reactants by conventional techniques. Such difunctional polyamide-forming reactants include but are not limited to diamines and dicarboxylic acids, amide-forming derivatives of dicarboxylic acids, lactams, and aminocarboxylic acids or amide-forming derivatives of aminocarboxylic acids. Generally, when one or more of the difunctional reactants is an aromatic diamine, such as para- or meta-phenylene diamine, the polyamide is prepared by conventional solution polymerization by reaction of the diamine with the acid chloride of the dicarboxylic acid in the appropriate solvent (e.g., dimethylacetamide). Interfacial polymerization may also be used.

Conventional techniques for polycondensation, such as melt polymerization or solution polymerization, are the preferred methods of making the modified polyamides of the invention. Melt polymerization utilizes an aqueous solution of an appropriate mixture of two or more diamine-dicarboxylic acid salts that is heated to remove water and effect polymerization. Each salt is conveniently prepared by mixing substantially equimolar amounts of dicarboxylic acid and diamine in water. The salts can be isolated from their respective solutions and combined in water to provide an aqueous solution of salts or the individual salt solutions may be combined. As used herein, the term "salt" refers to both isolated salts and salt solutions.

The salts are combined in a polymerizer such as an autoclave or other similar reaction vessel. By varying the concentrations of each salt solution, the weight of phosphorus in the polyamide is controlled. The total charge to a polymerizer or autoclave is typically 50–75% reactants and 50–25% water. For example, an aqueous slurry of salts can be added to a stainless steel, high-pressure autoclave which has previously been purged of air with purified nitrogen. The temperature and pressure are slowly raised, for example to about 220° C. and about 250 psig. Then the temperature is typically increased, for example to approximately 240° C. while the pressure is maintained at approximately 250 psig. The temperature is then raised above the melting point, approximately 275°–285° C., while the steam condensate is continuously removed. The pressure is then gradually reduced to atmospheric over an approximately 25 minute period. The polymer melt is then allowed to equilibrate for approximately 30 minutes at about 275°–285° C. The minimum temperature employed for melt polymerization of the copolyamides of this invention is usually about 270° C.

Scheme 1 depicts a two salt solution method to form a preferred embodiment of the invention. In Scheme 1, CEPPA is combined with hexamethylene diamine to form a first salt solution. Separately, hexamethylene diamine and adipic acid are combined to form a second salt solution, a Nylon 6,6 salt solution. Polyamide copolymers of CEPPA and nylon-6,6 are then prepared by polymerizing a mixture of the two salt solutions. In a separate preferred embodiment of the invention, in particular where lower levels of weight percent of phosphorus are desired, a slurry of diamine, dicarboxylic acid and carboxyphosphinic acid can be formed and directly polycondensed without the formation of separate salt solutions.

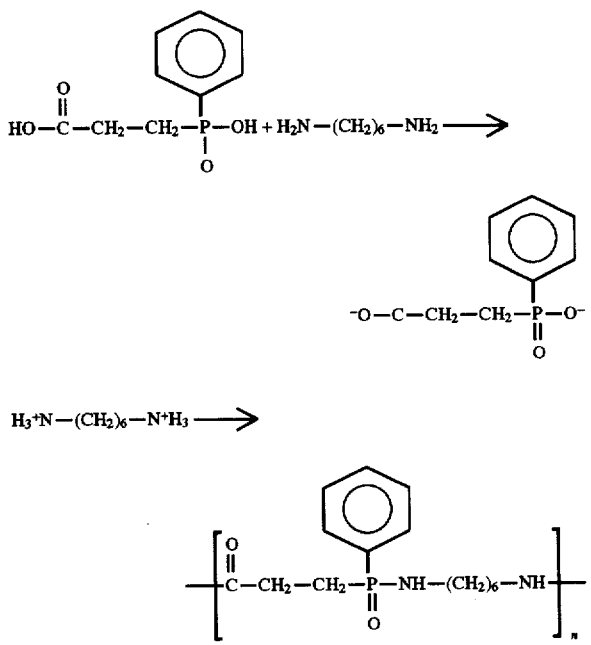

Scheme 1

-continued
Scheme 1

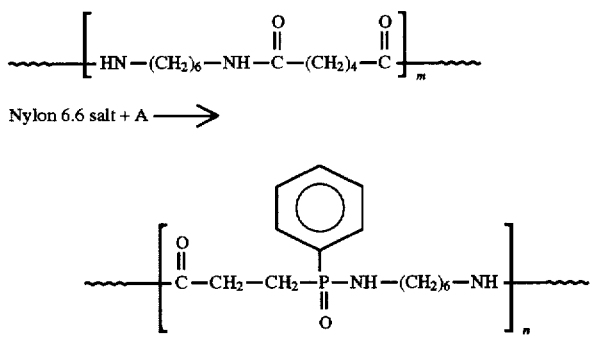

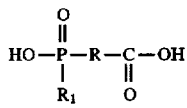
Nylon 6.6 salt + A ⟶

The present invention thus also provides a process for making a flame-retardant polyamide which comprises polycondensing at least one dicarboxylic acid, at least one diamine and a carboxy-phosphinic acid, said carboxy-phosphinic acid having the formula:

$$\text{HO}-\overset{\overset{\text{O}}{\|}}{\underset{R_1}{P}}-R-\overset{\overset{\text{O}}{\|}}{C}-\text{OH}$$

wherein R and $R_1$ are the same as defined above.

A preferred embodiment of the process comprises polycondensing a first salt of diamine and dicarboxylic acid with a second salt of diamine and the carboxy-phosphinic acid defined above, such that the resulting polyamide comprises between about 0.1% and about 1.0% by weight of phosphorous.

In a separately preferred embodiment, the polyamide produced by the melt polymerization technique described above is further solid state polymerized in order to increase the molecular weight of the polyamide.

Conditions which would be appropriate to achieve solid state polymerization are known to those of ordinary skill in the art. Typically, solid state polymerization comprises subjecting a finished polymer pellet to elevated temperatures for extended periods of time in order to promote the further polymerization of shorter chain polymer molecules, driving off additional water, and thereby increase the molecular weight of the polymer. For example, polyamide pellets produced by the melt polymerization techniques above can be loaded into an autoclave and held at an elevated temperature which is below the melting point of the polyamide, such as between 200° C. and 250° C., for any length of time desired so as to produce the molecular weight desired. Example 4 shows the production of preferred embodiments of the invention where a copolyamide having a molecular weight of 19,700 and containing 0.36% by weight phosphorus, is separately solid state polymerized at 220° C. for two, three, and four hours to produce copolyamide molding resins having molecular weights of 34,800, 40,800, and 48,100, respectively.

The polymer is typically extruded from the polymerizer, drawn through a quench bath of water, and then taken up as fiber on a bobbin, for example being wound with a Leesona winder. This fiber bundle can then be drawn to approximately 3 to 5 times its original length, for example over a hot pin at elevated temperatures such as between 60°–90° C.

The resultant fiber typically has a denier between 50–150. In a preferred embodiment the resultant fiber has a denier of 90–100.

The polyamides of this invention are most often drawn into synthetic fibers to make articles such as textiles, filter cloth, ropes, nets, conveyor belts, electrical insulation and tire cords. Polyamide in pellet form (molding resin) can also be injection molded or melt cast into articles such as bearings, gears, valve plates, pipes, housings, films, nuts, and bolts. The molding resins of the invention, as well as any fibers, textiles or articles comprising the molding resins, are thus rendered flame retardant or fire resistant. As used herein, the terms "flame retardant" and "fire resistant" are synonymous.

In a preferred embodiment, the polyamides of this invention are formed into synthetic fibers which can be used as textiles for such applications as flame retardant clothing, upholstery, carpeting and wall covering. The following examples are provided to illustrate the invention and are not intended, and should not be interpreted, to limit in any way the invention which is more fully defined in the claims.

The techniques for measurement of polymer melting point, intrinsic viscosity, moisture regain, boiling water-shrinkage, fiber denier, tenacity, elongation, and modulus are well known to those of ordinary skill in the art. Ridgway, J. S., *J. Applied Polymer Science*, Vol. 18, pages 1517–1528 (1974) discusses such techniques in the production of polyamides. The fiber properties of denier, tenacity, elongation, and modulus of the drawn fibers prepared according to the invention were determined on an Instron tester at a rate of extension of 100%/min with the use of a 1-in. gauge length and are typically measured at 72% relative humidity (RH), and 74° F.

The following terms are used in the Examples:
"RV" - relative viscosity
"$NH_2$ & $CO_2H$" - content in milliequivalents/g
"MW" - molecular weight (daltons)
"Ten" - tenacity (grams per denier, "gpd")
"Elong" - % elongation
"Mod" - modulus (gpd)

EXAMPLE 1

Preparation of CEPPA-hexamethylene Diamine Salt.

CEPPA-hexamethylene diamine salt was prepared by adding a solution of 0.0147 moles of the hexamethylene diamine ("HMD") in 8 mls of ethanol to a solution of 0.014 moles of CEPPA diacid in 7 ml of ethanol. The diamine solution was added dropwise over a six minute period. The temperature of the reaction mass increased from 24.2° C. to 38.1° C. in six minutes going through a maximum of 42.1° C. in about three minutes. Melting point range of the salt was between 220°–226° C. and a pH of 7.06 was measured for a 1% salt solution.

Using ethanol as the solvent the salt crystallizes out of solution. The salt solution can also be prepared by dissolving the reactants in water instead of ethanol and then can be used directly by mixing with HMDA/adipic acid salt solution prepared in Example 2 below. Since the resulting salt is soluble in water, it can be crystallized by addition of ethanol.

EXAMPLE 2

Preparation of Hexamethylenediamine \ Adipic Acid Salt

Adipic acid (14.60 g; 0.100 mole) was placed in a 250 ml Erlenmeyer flask, dissolved in 110 ml absolute ethyl alcohol by warming and cooled to room temperature. A solution of 11.83 g (0.12 mole) hexamethylenediamine (b.p. 90°–92° C./14 mm, m.p. 41°–42° C.) in 20 ml absolute ethyl alcohol is added quantitatively to the adipic acid solution. The mixing is accompanied by spontaneous warming and crystallization soon occurred. After standing overnight, the salt was filtered, washed with cold absolute alcohol, and air-dried to constant weight. The yield is 25.5 g. (97%). A 2% excess of diamine was used to promote a salt that is rich in diamine, since this is the more volatile component and may be lost during salt drying or during polycondensation. The white crystalline salt melts at 196°–197° C. and has a pH of about 7.6, determined on a 1% solution of salt in water, using a pH meter.

A pH tolerance of 0.5 unit is usually acceptable, especially on the high side because of the possible diamine loss noted above. Salt imbalance may be corrected by recrystallization or the after-addition of a small amount of the indicated component. Salts of low and high pH may be mixed to give a balanced composition of the proper pH.

EXAMPLE 3

Melt Polymerization of Salt Solutions

A 75% aqueous slurry of salts was added to a stainless steel, high-pressure autoclave which was previously purged of air with purified nitrogen. The temperature and pressure are slowly raised to 220° C. and 250 psig. The temperature was then increased to 240° C. while the pressure was maintained at approximately 250 psig. The temperature was then raised above the melting point, approximately 275° C.–285° C., while the steam condensate was continuously removed. The pressure was then gradually reduced to atmospheric over an approximately 25 minute period. The polymer melt was allowed to equilibrate for approximately 30 minutes at about 275° C.–285° C. The minimum temperature employed for melt polymerization of the copolyamides of this invention is usually about 270° C.

Table 1 provides a examples of weight ratios of salt solutions useful for producing representative examples of copolyamides of this invention.

TABLE 1

| Wt. % P | CEPPA/HMDA salt | HMDA/AA salt |
|---|---|---|
| 0.16 | 1 | 65 |
| 0.25 | 1 | 41 |
| 0.32 | 1 | 32 |
| 0.36 | 1 | 28 |
| 0.54 | 1 | 19 |
| 1.00 | 1 | 10 |

Properties of the fibers drawn from the copolymer of this invention containing 0.24% by weight phosphorous are compared with the fibers from nylon 6,6 control in Table 2. The numbers in parentheses demonstrate the measurements of properties after boiling water extraction for 30 minutes. Exposure to boiling water is used to determine the extent to which CEPPA is polymer-bound since CEPPA, by itself, is water soluble. Phosphorus levels were also tested for the copolymer containing 0.24% by weight phosphorous which showed levels of phosphorous of 2396 ppm before and 2193 ppm after boiling water extraction. The 200 ppm loss in phosphorus levels is attributed to the loss of phosphorus supplied by optional polymerization co-reactants such as benzene phosphinic acid and manganese hypophosphate, which are not polymer bound and are easily washed away in the test. Levels of phosphorus are determined using techniques well known to those of ordinary skill in the art such as X-ray diffraction and $^{31}$P-NMR.

TABLE 2

| Polymer | Relative Viscosity | NH$_2$ & CO$_2$H | Mol. Wt. | Melt. Point | Tenacity | Elongation | Modulus |
|---|---|---|---|---|---|---|---|
| Nylon 6, 6 control | 43 (41.7) | 33/87 (33/89) | 40,400 | 256° C. | 3.2 (2.05) | 91.2 (76.7) | 25.2 (15.6) |
| Copolymer (0.24 wt % CEPPA) | 25 (25) | 94/115 (82.5/115) | 27,300 | 258° C. | 3.21 (2.05) | 86.3 (77) | 32 (15.6) |

The data in Table 2 show that although the molecular weight of the copolymer containing CEPPA is relatively low compared to the nylon control, its physical properties are very similar to the nylon 6,6 control, indicating that the molecular weight required for critical entanglement chain length has been achieved.

No significant change in the phosphorus content and total retention of relative viscosity suggests that phosphorus is bound to the polymer chain and the copolymer's hydrolytic stability is very similar to nylon 6,6. This is further supported by the fact that the mechanical properties of the copolymer, i.e., tenacity, elongation and modulus, after the 30 minute water boil are nearly identical to those of the nylon 6,6 control.

EXAMPLE 4

Solid State Polymerization

The molecular weights of the copolymer containing 0.25% by weight phosphorus may be acceptable for some fiber and thermoplastic applications but, if needed, molecular weight could be further increased to the desired level by solid state polymerization.

Table 3 shows properties of nylon 6,6 copolymers with CEPPA including the molecular weights of the copolymers containing different amounts of phosphorus, obtained by the melt condensation process and by further solid state polymerization at 220° C. "MW #1" and "MW #2" represent the average molecular weight of the polymers before and after solid state polymerization. The three values presented for the polymer containing 0.36% CEPPA represent readings after solid state polymerization for two, three, and four hours, respectively.

TABLE 3

| Polyamide | Weight % P | MW #1 | MW #2 |
|---|---|---|---|
| 1 | 0.16 | 28,000 | 70,700 |
| 2 | 0.32 | 22,000 | 82,600 |
| 3 | 0.36 | 19,700 | 34,000 |
|  |  |  | 40,800 |
|  |  |  | 48,000 |
| 4 | 0.54 | 11,000 | 27,000 |

Although the molecular weights of the copolymers decrease with increasing CEPPA content, as shown above, polymer compositions can be solid state polymerized to higher molecular weight. Molecular weight can be adjusted to the desired level by varying the time, temperature or the catalyst during the solid state polymerization. For example, as shown in Table 3, a copolymer of 19,700 molecular weight, containing 0.36% by weight phosphorus, can be solid state polymerized to a molecular weight of 34,800, 40,800, or 48,100 by varying the length of time of the solid state polymerization step.

EXAMPLE 5

Fiber Flammability Test

Flammability of the nylon control and the copolymer was tested by a method, devised by John Stoddard, O. A. Pickett, C. J. Cicero and J. H. Saunders Text. Res. J., Vol. 45, p. 454 (1975). An eighteen inch long bundle of fiber was held vertically and ignited. The fiber bundle was relit each time the flame extinguished. The number of relights required for a complete burn is the measure of flame resistance of the fiber. Nylon 6,6 containing 0.36 weight % phosphorus required 30 relights to achieve a complete burn compared to 16 relights for the nylon control thus indicating substantial improvement in fire retardancy for the modified polyamides of this invention.

EXAMPLE 6

Finished Article Flammability Tests

I. Introduction

Flammability tests were conducted on floor covering material made from polyamide fibers of this invention in accordance with the American Society for Test and Materials response standard E 648-95a. *Critical Radiant Flux of Floor-Covering Systems Using a Radiant Heat Energy Source*. This method is sometimes referred to as the flooring radiant panel test.

This test method, which has been approved for use by agencies of the Department of Defense and for listing in the DoD *Index of Specifications and Standards*, is technically identical to the method described in NFPA Number 253. The test results are used as elements of a fire-hazard assessment or a fire-risk assessment which also takes into account all of the factors pertinent to an assessment of the fire hazard or fire risk of a particular end use of polymer fibers.

The flooring radiant panel test measures the level of incident radiant heat energy at flame-out of a horizontally mounted complete floor covering systems that duplicate or simulate accepted installation practices. The testing methods provide a basis for estimating one aspect of fire behavior of systems installed, for example, in corridors or exit ways. Imposed radiant flux simulates thermal radiation levels likely to impinge on the floors of a building whose upper surfaces are heated by flames or hot gases, or both, from a fully developed fire in an adjacent room or compartment.

II. Preparation of Samples

Floor covering made from the flame retardant polyamide fibers of the claimed invention, referred to as "Sample A" were compared to floor covering made from polyamide fibers containing no flame retardant, referred to as "Control". Sample A was prepared according to the procedures outlined in the Examples above including solid state polymerization. Tables 4 and 5 show the physical characteristics of the fibers.

TABLE 4

PHOSPHORUS CONTRIBUTION (ppm)

| Item | BPA | MHP | CEPPA | Theo/ Found | RV | NH2/ COOH |
|---|---|---|---|---|---|---|
| Control | 200 | 15 | 0 | 215/246 | 51 | 59/77 |
| Sample A | 200 | 15 | 1850 | 2063/2032 | 29 | 198/70 |
| Sample A (solid state) |  |  |  | — | 68 | — |

"BPA" - benzene phosphinic acid
"MHP" - manganese hypophosphate

TABLE 5

Fiber Spinning and Draw Jet ID

| | Spinning Tenacity/% Elongation | Jet Texturing |
|---|---|---|
| Control | 1.05/440 | Yes |
| Sample A (solid state) | 1.03/452 | Yes |

III. Test Procedure

A gas and air fueled radiant heat energy panel is mounted in the test chamber at a 30° angle to the horizontal plane of the specimen. The panel generates an energy flux distribution ranging along the length of the test specimen from a nominal maximum of 1.0 W/cm$^2$ to a minimum of 0.1 W/cm$^2$. Air flow through the chamber is controlled at a velocity of 250 feet per minute. The test is initiated using a gas pilot burner brought into contact with the specimen and extinguished after a specified time.

All floor covering specimens were cut pile construction containing a woven synthetic secondary back. The coverings were applied over cushion underlay (40-ounce Hair/Jute) on a GRC board subfloor. Each floor-covering system was tested in triplicate, each specimen measuring 20 cm wide by 100 cm long. Prepared specimens were conditioned a minimum of 96 hours in an atmosphere maintained at 71±2° F. and 50±3% relative humidity. Chamber operating conditions were verified on the day of the test by measuring the flux level at the 40 cm mark. An incident flux level of 0.50±0.02 W/cm$^2$ indicates proper operation and calibration of the test chamber.

Specimens were placed in the chamber and allowed to preheat for 5.0 minutes followed by a 5.0-minute application of the pilot burner. The specimens were allowed to burn until they self-extinguish, at which time they were removed from the test chamber and the farthest point of flame propagation measured. The critical radiant flux is determined from the flux profile determined during calibration of the test instrument.

IV. Results

The test results, provided in Tables 6 and 7, represent the average value of the three specimens tested expressed in terms of Critical Radiant Flux in units of $W/cm^2$. All pertinent individual specimen data are presented in Table II. The flux profile shown in the figure is typical of that determined during calibration of the flooring radiant panel instrument used for this test.

The general classification for the floor-covering system identified in this report is based on criteria published in the NFPA 101 Life Safety Code. The GSA classification is based on criteria published In Amendment 6 to GSA Solicitation Number 3FNH-92-F301-N, effective Jun. 16, 1994. However, care must be exercised in their use as a material may be otherwise classified by the authority having jurisdiction.

TABLE 6

| Control Test Results | | | |
|---|---|---|---|
| | #1 | #2 | #3 |
| Maximum Burn Distance (cm) | 100.0 | 100.0 | 100.0 |
| Time to Flame Out (min.) | 86.6 | 88.0 | 84.1 |
| Critical Radiant Flux (W/cm²) | <0.11 | <0.11 | <0.11 |
| Average Critical Radiant Flux | <0.11 W/cm² | | |

TABLE 7

| Sample A Test Results | | | |
|---|---|---|---|
| | #1 | #2 | #3 |
| Maximum Burn Distance (cm) | 51.7 | 50.0 | 49.8 |
| Time to Flame Out (min.) | 24.9 | 24.0 | 23.6 |
| Critical Radiant Flux (W/cm²) | 0.33 | 0.35 | 0.35 |
| Standard Deviation | 0.0123 | | |
| Average Critical Radiant Flux | 0.34 W/cm² | | |
| NFPA 101 Classification | Type II | | |
| GSA Classification | Class B | | |

What is claimed is:

1. A flame-retardant polyamide which is the polycondensation product of at least one dicarboxylic acid, at least one diamine and a flame-retarding carboxy-phosphinic acid, said carboxy-phosphinic acid being a source of flame-retardant phosphorus and having the formula:

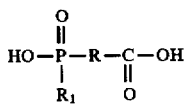

wherein R is saturated or unsaturated, straight chain, branched or cyclic $C_1$ to $C_{15}$ alkylene, or a $C_5$ to $C_{15}$ arylene or aralkylene, wherein the alkylene portion is saturated or unsaturated, straight chain branched or cyclic, and $R_1$ is lower alkyl, lower alkoxy, allyl, aryl alkylaryl or alkoxyaryl, wherein the alkyl portion is saturated or unsaturated, straight chain branched or cyclic, and wherein R and $R_1$ may contain one or more O or S atoms; such that the polyamide comprises between about 0.10% and about 1.0% by weight of phosphorous.

2. The polyamide of claim 1 wherein R is a straight chain alkyl group having from 1 to 7 carbon atoms.

3. The polyamide of claim 1 wherein $R_1$ is aryl.

4. The polyamide of claim 1 wherein R is ethylene and $R_1$ is $-C_6H_5$.

5. The polyamide of claim 1 which comprises between about 0.16% and about 0.56% by weight phosphorous.

6. The polyamide of claim 1 which comprises about 0.25% by weight phosphorous.

7. A flame-retardant polyamide which is the polycondensation product of adipic acid, hexamethylene diamine and a flame-retarding carboxy-phosphinic acid having the formula:

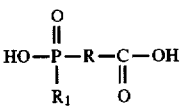

wherein R is saturated or unsaturated, straight chain, branched or cyclic $C_1$ to $C_{15}$ alkylene, or a $C_5$ to $C_{15}$ arylene or aralkylene, wherein the alkylene portion is saturated or unsaturated, straight chain branched or cyclic, and $R_1$ is lower alkyl, lower alkoxy, allyl, aryl alkylaryl or alkoxyaryl, wherein the alkyl portion is saturated or unsaturated, straight chain branched or cyclic, and wherein R and $R_1$ may contain one or more O or S atoms; such that the polyamide comprises between about 0.10% and about 1.0% by weight of phosphorous.

8. The polyamide of claim 7 wherein R is a straight chain alkyl group having from 1 to 7 carbon atoms.

9. The polyamide of claim 7 wherein $R_1$ is aryl.

10. The polyamide of claim 7 wherein R is ethylene and $R_1$ is $-C_6H_5$.

11. The polyamide of claim 7 which comprises between about 0.16% and about 0.56% by weight phosphorous.

12. The polyamide of claim 7 which comprises about 0.25% by weight phosphorous.

13. A process for making a flame-retardant polyamide which comprises polycondensing at least one dicarboxylic acid, at least one diamine and a carboxy-phosphinic acid, said carboxy-phosphinic acid having the formula:

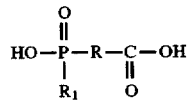

wherein R is saturated or unsaturated, straight chain, branched or cyclic $C_1$ to $C_{15}$ alkylene, or a $C_5$ to $C_{15}$ arylene or aralkylene, wherein the alkylene portion is saturated or unsaturated, straight chain branched or cyclic, and $R_1$ is lower alkyl, lower alkoxy, allyl, aryl alkylaryl or alkoxyaryl, wherein the alkyl portion is saturated or unsaturated, straight chain branched or cyclic, and wherein R and $R_1$ may contain one or more O or S atoms; such that the polyamide comprises between about 0.10% and about 1.0% by weight of phosphorous.

14. The process of claim 13 wherein in the flame-retarding phosphorus-containing structural unit R is a straight chain alkyl group having from 1 to 7 carbon atoms.

15. The process of claim 13 wherein in the flame-retarding phosphorus-containing structural unit $R_1$ is aryl.

16. The process of claim 13 wherein in the flame-retarding phosphorus-containing structural unit R is ethylene and $R_1$ is —$C_6H_5$.

17. The process of claim 13 which produces a polyamide comprising between about 0.16% and about 0.56% by weight phosphorous.

18. The process of claim 13 which produces a polyamide comprising between about 0.25% by weight phosphorous.

19. The process of claim 13 further comprising subjecting the resulting polyamide to conditions appropriate to achieve solid state polymerization of the polyamide.

20. A process for making a flame-retardant polyamide which comprises polycondensing (i) a first salt of diamine and dicarboxylic acid and (ii) a second salt of diamine and a carboxy-phosphinic acid, said carboxy-phosphinic acid being a source of flame-retarding phosphorous and having the formula:

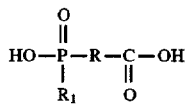

wherein R is saturated or unsaturated, straight chain, branched or cyclic $C_1$ to $C_{15}$ alkylene, or a $C_5$ to $C_{15}$ arylene or aralkylene, wherein the alkylene portion is saturated or unsaturated, straight chain branched or cyclic, and $R_1$ is lower alkyl, lower alkoxy, allyl, aryl alkylaryl or alkoxyaryl, wherein the alkyl portion is saturated or unsaturated, straight chain branched or cyclic, and wherein R and $R_1$ may contain one or more O or S atoms; such that the polyamide comprises between about 0.10% and about 1.0% by weight of phosphorous.

21. The process of claim 20 wherein the first salt is a salt of hexamethylene diamine and adipic acid.

22. The process of claim 21 wherein the second salt is a salt of hexamethylene diamine and carboxy-phosphinic acid.

23. The process of claim 22 wherein in the flame-retarding phosphorus-containing structural unit R is a straight chain alkyl group having from 1 to 7 carbon atoms.

24. The process of claim 22 wherein in the flame-retarding phosphorus-containing structural unit $R_1$ is aryl.

25. The process of claim 22 wherein in the flame-retarding phosphorus-containing structural unit R is ethylene and $R_1$ is —$C_6H_5$.

26. The process of claim 22 which produces a polyamide comprising between about 0.16% and about 0.56% by weight phosphorous.

27. The process of claim 22 which produces a polyamide comprising between about 0.25% by weight phosphorous.

28. The process of claim 28 further comprising subjecting the resulting polyamide to conditions appropriate to achieve solid state polymerization of the polyamide.

29. A process for making a flame-retardant polyamide which comprises polycondensing a salt slurry comprising diamine, dicarboxylic acid, and a carboxy-phosphinic acid, said carboxy-phosphinic acid being a source of flame-retarding phosphorous and having the formula:

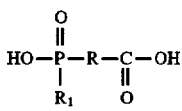

wherein R is saturated or unsaturated, straight chain, branched or cyclic $C_1$ to $C_{15}$ alkylene, or a $C_5$ to $C_{15}$ arylene or aralkylene, wherein the alkylene portion is saturated or unsaturated, straight chain branched or cyclic, and $R_1$ is lower alkyl, lower alkoxy, allyl, aryl alkylaryl or alkoxyaryl, wherein the alkyl portion is saturated or unsaturated, straight chain branched or cyclic, and wherein R and $R_1$ may contain one or more O or S atoms; such that the polyamide comprises between about 0.10% and about 1.0% by weight of phosphorous.

30. Molding resin comprising the polyamide of claim 1.

31. A flame-retardant article comprising the polyamide of claim 1.

32. Flame-retardant polyamide fiber comprising the polyamide of claim 1.

33. Flame-retardant textile comprising the fiber of claim 32.

* * * * *